United States Patent [19]

Paspati

[11] Patent Number: 4,815,771
[45] Date of Patent: Mar. 28, 1989

[54] COUPLING SYSTEM FOR CONDUITS

[76] Inventor: George A. Paspati, 32 Academias Street, 10672 Athens, Greece

[21] Appl. No.: 202,486

[22] Filed: Jun. 6, 1988

[51] Int. Cl.[4] .............................................. F16L 27/04
[52] U.S. Cl. ................................... 285/263; 285/237; 285/377
[58] Field of Search ............... 285/263, 268, 376, 377, 285/401, 237

[56] References Cited

U.S. PATENT DOCUMENTS

| | | |
|---|---|---|
| 2,290,403 | 7/1942 | Wyss . |
| 2,327,572 | 8/1943 | Wallis . |
| 2,413,402 | 12/1945 | Becker . |
| 2,558,695 | 6/1951 | Unger . |
| 2,587,475 | 2/1952 | Hudson . |
| 3,304,104 | 2/1987 | Wihse .............................. 285/234 X |
| 4,033,613 | 7/1977 | Bram ................................ 285/37 X |
| 4,443,030 | 4/1984 | Hairston et al. ..................... 285/263 |
| 4,641,861 | 2/1987 | Scoboria ........................ 285/376 X |

Primary Examiner—Joseph Falk
Attorney, Agent, or Firm—Norman B. Rainer

[57] ABSTRACT

A coupling device is provided for rapidly joining fluid-carrying conduits in either straight line or angled alignment. The device utilizes a male portion and a female portion which interengage at mating spherically contoured surfaces. A circular resilient gasket such as an O-ring is embedded in one of the mating surfaces. A rotatable lock ring is disposed upon one of the portions and is adapted to engage interactive locking projections associated with the other portion.

11 Claims, 2 Drawing Sheets

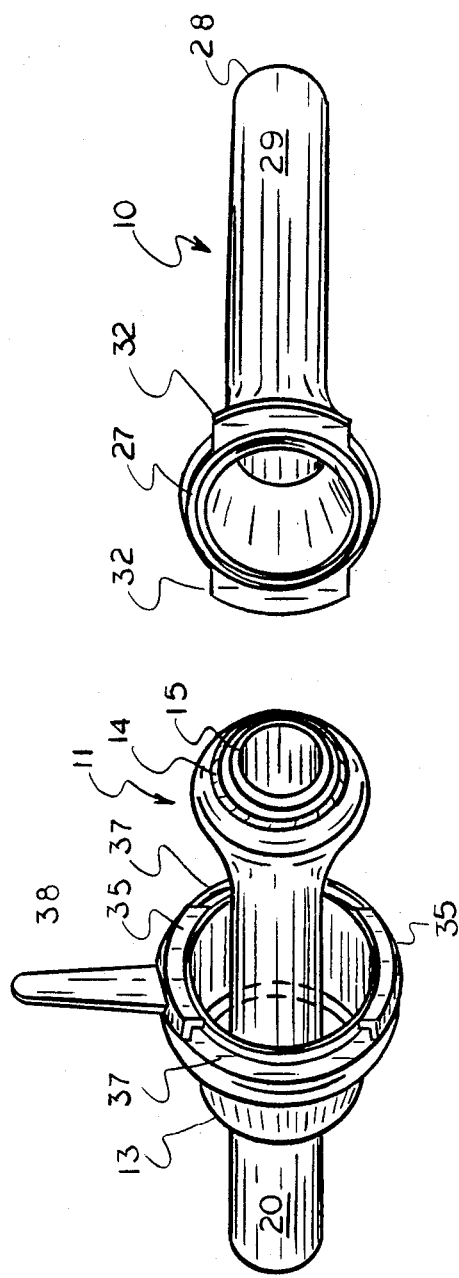
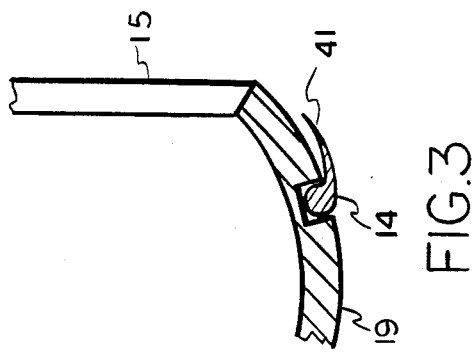
FIG.2
FIG.3

COUPLING SYSTEM FOR CONDUITS

BACKGROUND OF THE INVENTION

This invention relates generally to couplings for conduits that convey fluids such as liquids and gases, and more particularly concerns a system for achieving fluid-tight joinder of the non-threaded ends of two cylindrical tubes or pipes.

In the case of surface irrigation pipelines, it is often necessary to rapidly couple and uncouple pipe sections without the benefit of tools, and further enable the pipeline to be contoured around obstacles or to conform with the terrain it interacts with. Pipe sections leading to irrigation system sprinkler heads must also be amenable to quick coupling and positioned adjustability relative to other portions of the pipeline.

Coupling systems for tubes and pipes are well known. However, many such systems require the use of tools or depend upon threaded fittings which, in irrigation systems, are difficult to maintain clean. Other coupling systems necessitate straight line coaxial engagement of the pipe segments without permitting any angular deflection at the joint.

In certain earlier disclosed rapidly activated coupling devices, a resilient flap is employed which, under hydraulic pressure, is displaced against a seating member, thereby forming a sealed juncture. The uncoupling of such devices can be extremely difficult in field use especially when the conduits still contain pressurized fluid. In other rapid coupling devices, the conduits are brought together in the axial direction with sufficient manually applied force to compress a resilient gasket which thereby produces a sealed juncture. Such coupling devices, requiring manual compressive force, generally involved multi-component lever mechanisms that are difficult to manipulate and require external pivot means susceptible to malfunction after extensive use and outdoor exposure.

A problem generally associated with quick acting coupling devices is that, after considerable use, wear and erosion of critically dimensioned components causes malfunction. In conduit systems handling corrosive liquids, it is sometimes desirable to be able to drain the system of stagnent fluid when not in use, especially at the couplings, in order to minimize corrosive damage. Most coupling devices are not able to permit controlled draining while still engaging the conduits.

It is accordingly an object of the present invention to provide a conduit coupling which is quickly operable without tools.

It is a further object of this invention to provide a coupling as in the foregoing object which permits leak-free joinder of the ends of two conduits that may not be in coaxial alignment.

It is another object of this invention to provide a coupling of the aforesaid nature which compensates for wear and permits controlled drainage.

It is still another object of the present invention to provide a coupling of the aforesaid nature of rugged, durable construction amenable to low cost manufacture.

These objects and other objects and advantages of the invention will be apparent from the following description.

SUMMARY OF THE INVENTION

The above and other beneficial objects and advantages are accomplished in accordance with the present invention by a coupling device comprising:

(1) a male portion comprised of a straight length of tubing having open proximal and distal extremities of substantially equal circular diameters, said tubing being of circular cylindrical configuration contiguous to said distal extremity and having contiguous to said proximal extremity an outwardly flared zone having an exterior bearing surface of spherically contoured configuration, exteriorly disposed abutment means located between said extremities, and a circular recess disposed within said bearing surface and centered upon the axis of the tube.

(2) a female portion comprised of a straight length of tubing having open proximal and distal extremities, said tubing being of circular cylindrical configuration contiguous to said distal extremity and having contiguous to said proximal extremity an outwardly flared zone having an interior bearing surface shaped to receive said exterior bearing surface, and at least two locking projections associated with said proximal extremity and disposed in a circular locus centered upon the axis of said tubing, (3) a lock ring slidably disposed upon said exterior bearing surface and having a forward extremity directed toward the female portion, a flange disposed upon said forward extremity and comprised of retaining grooves that open onto said exterior bearing surface, and spaces between said grooves that permit entrance of said locking projections into said retaining grooves, and a manipulating handle attached to said lock ring and extending radially outward therefrom, (4) a resilient sleeve disposed upon said male portion between said abutment means and said lock ring, and serving to urge said lock ring toward said female portion, and (5) resilient gasket means held by said circular recess, whereby, (6) when exterior bearing surface is placed in mating contact with said interior bearing surface and the lock ring is caused to rotatively engage said locking projections, the male and female portions are urged togehter and the gasket means forms an impermeable seal between the bearing surfaces.

In preferred embodiments of the invention, the male portion, female portion and lock ring are each monolithic structures, having been fabricated of an engineering grade thermoplastic resin by a molding operation. The components of the device may also be fabricated of metals such as aluminum, and other materials such as ceramics and glass. The distal extremities of the male and female portions are adapted to engage pipe ends by a telescoping action wherein the coupling portion either fits within or around the pipe end. Bonding or sealing agents may be utilized to assure an impervious seal between the coupling portions and the pipe ends. The locking projections may have a tapered thickness whereby they exert a wedge-like effect upon the lock ring, during rotation of the handle, thereby forcing the coupling portions together.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 2 is a perspective view of the embodiment of FIG. 1 in its disengaged or uncoupled state.

FIG. 3 is a fragmentary sectional view of an alternative embodiment of a component of the coupling device.

DESCRIPTION OF THE PREFERRED EMBODIMENT

Figure 1:
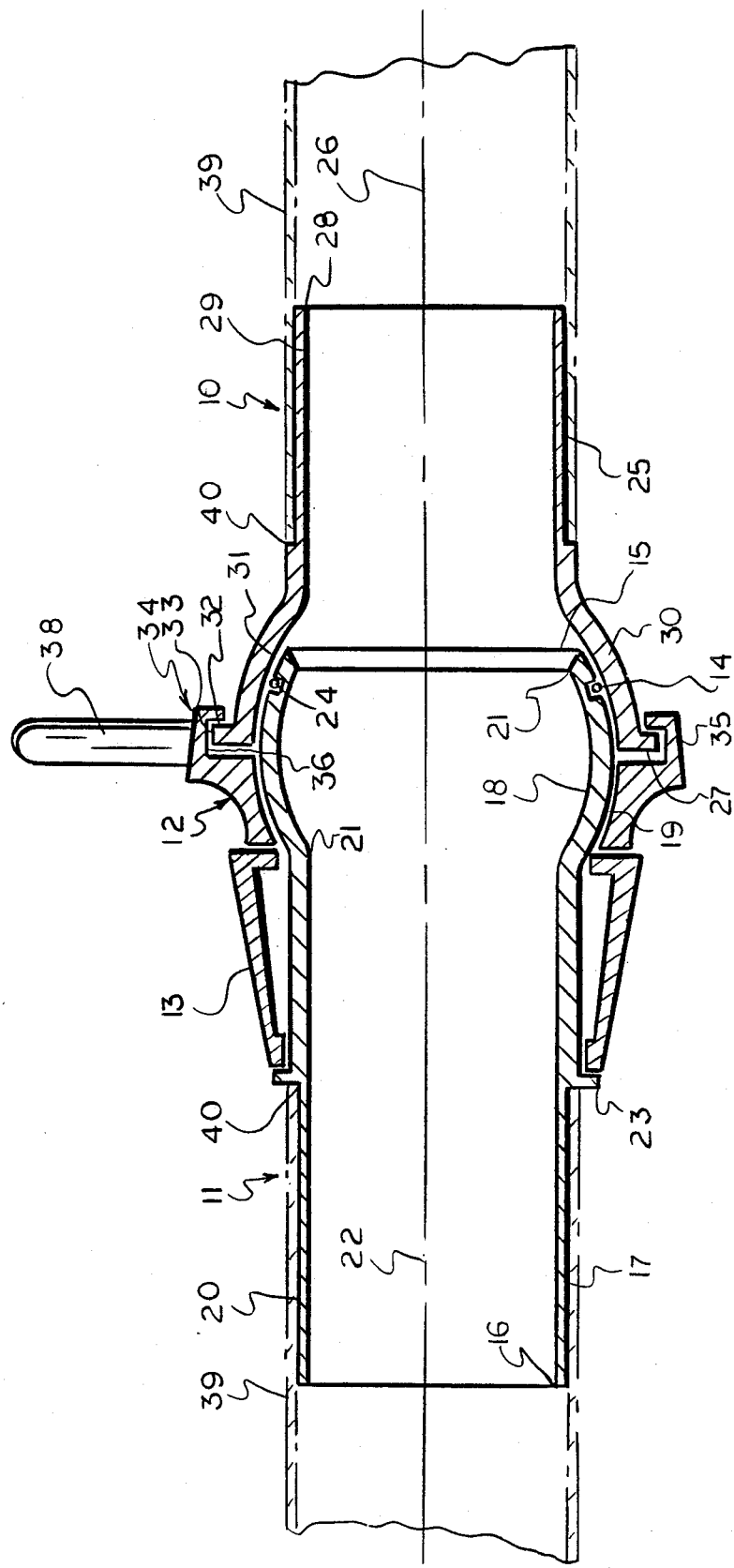
FIG. 1 is a sectional side view of an embodiment of the coupling device of the present invention in its engaged or coupled state.

Referring to FIGS. 1 and 2, an embodiment of the coupling device of the present invention is shown comprised of female portion 10 and male portion 11 having lock ring 12, resilient sleeve 13, and resilient gasket means in the form of O-ring 14.

Male portion 11 is comprised of a straight length of tubing 20 having a center axis 22 and open proximal and distal extremities, 15 and 16, respectively, of substantially equal circular diameters. The region 17 of the tubing contiguous to said distal extremity is of circular cylindrical configuration. An outwardly flared zone 18 is disposed contiguous to said proximal extremity, said zone 18 having an exterior bearing surface 19 of spherically contoured configuration. More accurately described, bearing surface 19 is a sector of a sphere taken symmetrically about the center of the sphere and having opposed circular perimeters 21 centered upon axis 22 and whose diameters substantially match the diameter of tubing 20.

An annular abutment shoulder 23 protrudes from the exterior of tubing 20 at a site substantially midway between extremities 15 and 16. A circular recess 24 centered upon axis 22 is disposed within bearing surface 19 for the purpose of retaining O-ring 14.

Female portion 10 is comprised of a straight length of tubing 25 having a center axis 26 and open proximal and distal extremities 27 and 28, respectively. The region 29 of the tubing contiguous to said distal extremity is of circular cylindrical configuration centered upon axis 26. An outwardly flared zone 30 is disposed contiguous to proximal extremity 27, said zone 30 having an interior bearing surface 31 having a spherical contour adapted to make close-fitting sliding contact with external bearing surface 19. Two identical locking projections 32 equiangularly disposed about axis 26 extend outwardly from proximal extremity 27, and are disposed in a circular locus centered upon axis 26. The outermost edge 33 of each projection has an arcuate curvature substantially centered upon axis 26. In alternative embodiments, three or more identical projections may be utilized, equiangularly disposed about axis 26.

Lock ring 12 is slidably disposed upon that portion of exterior bearing surface 19 which is downwardly curved toward distal extremity 16. Said lock ring has a forward extremity 34 directed toward proximal extremity 15. A segmented flange 35 is disposed upon said forward extremity 34, said flange being comprised of retaining grooves 36 that open onto exterior bearing surface 19. Spaces 37 between the segments of flange 35 permit entrance of locking projections 32 into retaining grooves 36. A manipulating handle 38 extends radially outward from lock ring 12.

Resilient sleeve 13, disposed upon said male portion between abutment shoulder 23 and lock ring 12, serves to urge the lock ring toward proximal extremity 15.

As shown in FIG. 1, the distal extremities of both male and female portions, and the cylindrical tubing contiguous to said extremities are adapted to telescopically engage the ends of conduit piping 39. To control the depth of telescopic engagement, annual shoulders 40 may be disposed within the tubing component.

Because of the specialized design and construction of the coupling device of this invention, the separate halves may be quickly brought together and sealed to form a leak-proof connection. Sealing of the coupling is achieved by contact of the resilient gasket means with interior bearing surface 31. In the embodiment of the coupling exemplified in FIGS. 1 and 2, said contact is achieved by compressive force exerted upon the O-ring by rotative movement of handle 38. The axes of the separate halves may be in alignment or in angled relationship. Because of its specialized construction and manner of achieving sealing, the coupling of this invention can tolerate wear factors.

In the alternative embodiment shown in FIG. 3, the gasket means is an O-ring having a skirt-like appendage 41 oriented in the upstream direction of fluid flow and disposed adjacent interior bearing surface 31. The function of the skirt is to achieve sealing primarily by virtue of hydrostatic pressue which deflects appendage 41 into surface 31. When there is no flow of fluid through the conduits, appendage 41 permits controlled leakage from the coupling.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A coupling device for fluid-conveying pipes comprising:
    (a) a male portion comprised of a straight length of tubing having open proximal and distal extremities of substantially equal circular diameters, said tubing being of circular cylindrical configuration contiguous to said distal extremity and having contiguous to said proximal extremity an outwardly flared zone having an exterior bearing surface of spherically contoured configuration, and exteriorly disposed abutment means located between said extremities,
    (b) a female portion comprised of a straight length of tubing having open proximal and distal extremities, said tubing being of circular cylindrical configuration contiguous to said distal extremity and having contiguous to said proximal extremity an outwardly flared zone having an interior bearing surface shaped to receive said exterior bearing surface, and at least two locking projections associated with said proximal extremity and disposed in a circular locus centered upon the axis of said tubing,
    (c) a circular recess disposed within one of said bearing surfaces and centered upon the axis of the associated length of tubing,
    (d) a lock ring slidably disposed upon said exterior bearing surface and having a forward extremity directed toward the female portion, a flange disposed upon said forward extremity and comprised of retaining grooves that open onto said exterior bearing surface, and spaced between said grooves that permit entrance of said locking projections into said retaining grooves, and a manipulating handle attached to said lock ring and extending radially outward therefrom, (e) a resilient sleeve disposed upon said male portion between said abutment means and said lock ring, and serving to urge said lock ring toward said female portion, and (f) resilient gasket means held by said circular recess, whereby, (g) when said exterior bearing surface is placed in mating contact with said interior bearing surface and the lock ring is caused to rotatively engage said locking projections, the male and female portions are urged together and the gasket means forms an impermeable seal between the bearing surfaces.

2. The device of claim 1 wherein the male portion, female portion and lock ring are each monolithic structures.

3. The device of claim 2, said monolithic structures having been fabricated by a molding operation utilizing a substance selected from the group consisting of engineering grade thermoplastic resin, metal, ceramic and glass.

4. The device of claim 1 wherein the distal extremities of said male and female portions are adapted to engage pipe ends by a telescoping action wherein the coupling portion fits within or around the pipe end.

5. The device of claim 4 wherein bonding agents are utilized to assure an impervious seal between the coupling portions and the pipe ends.

6. The device of claim 1 wherein said locking projections have a tapered thickness whereby they exert a wedge-like effect upon the lock ring during rotation of the handle, thereby forcing the coupling portion together.

7. The device of claim 1 wherein said resilient gasket means is an O-ring.

8. The device of claim 1 wherein said resilient gasket means has a skirt-like appendage oriented in the upstream direction of fluid flow and disposed adjacent said interior bearing surface.

9. The device of claim 1 wherein said lock ring is disposed upon a portion of said exterior bearing surface which is downwardly directed toward the distal extremity of said male portion.

10. The device of claim 1 wherein said locking projections are equidistantly separated within said circular locus.

11. The device of claim 1 wherein said circular recess is located within said exterior bearing surface.

* * * * *